United States Patent [19]

Katz

[11] 4,225,274
[45] Sep. 30, 1980

[54] DRILLING TOOL

[75] Inventor: Otto Katz, Horb-Bildechingen, Fed. Rep. of Germany

[73] Assignee: Ledermann GmbH & Co., Horb, Fed. Rep. of Germany

[21] Appl. No.: 33,375

[22] Filed: Apr. 26, 1979

[30] Foreign Application Priority Data

Apr. 26, 1978 [DE] Fed. Rep. of Germany ... 7812666[U]

[51] Int. Cl.³ ...................... B23B 51/00; B27G 13/00
[52] U.S. Cl. .................................... 408/225; 408/713; 408/239 R; 144/220
[58] Field of Search ............... 408/201, 203, 211, 212, 408/223, 224, 225, 227, 229, 713, 239 R; 144/220, 228, 229

[56] References Cited

U.S. PATENT DOCUMENTS

| 2,577,986 | 12/1951 | Wilson | 408/212 |
| 2,630,725 | 3/1953 | Black | 408/224 |
| 3,737,245 | 6/1973 | Mater | 408/225 |
| 3,842,873 | 10/1974 | Valo | 144/220 |
| 3,963,365 | 6/1976 | Shallenberger et al. | 408/713 X |
| 4,124,328 | 11/1978 | Hopkins | 408/713 X |
| 4,133,399 | 1/1979 | Herrmann | 408/713 X |

Primary Examiner—Harrison L. Hinson
Attorney, Agent, or Firm—Becker & Becker, Inc.

[57] ABSTRACT

Tool for drilling holes, such as cylinder head drill, woodworking drill, and the like, which includes a carrier member having at least one endwise arranged end face cutter, or first cutting means, and at least one precutter, or second cutting means, extending in endwise direction, and circumferentially beyond the carrier member, the precutter defining the diameter of the hole to be produced with the tool and including at least one cutting edge. At least the part adjacent the cutting edge of the precutter is approximately parallel to the pertaining circumferential portion of the carrier member. The outer side of the precutter includes at least one guide surface parallel to the outer circumferential portion of the carrier member. The end face cutter and the precutter are removably securable with at least one clamping element to the carrier member and can be in the form of reversible cutting elements.

24 Claims, 26 Drawing Figures

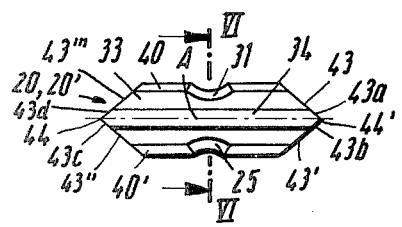
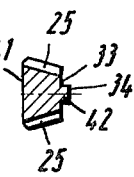
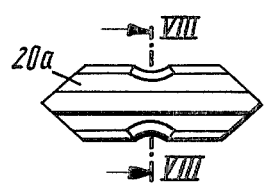
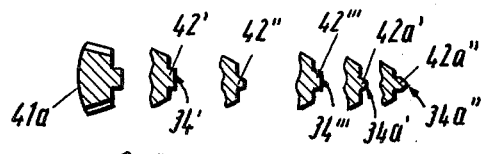
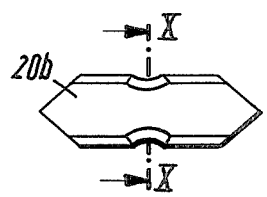
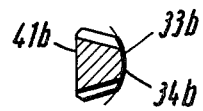
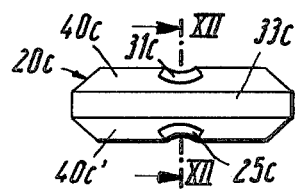
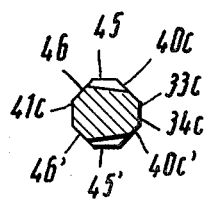
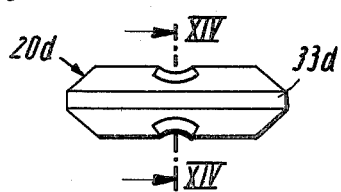
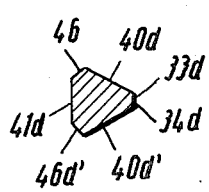
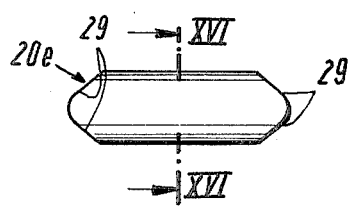
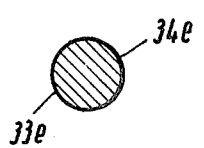

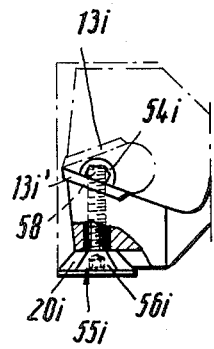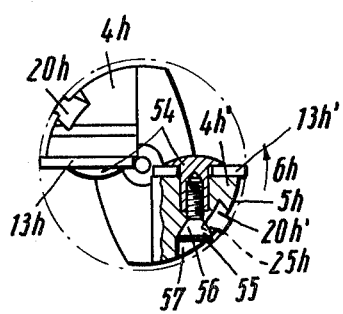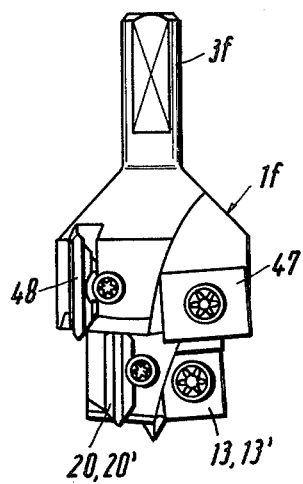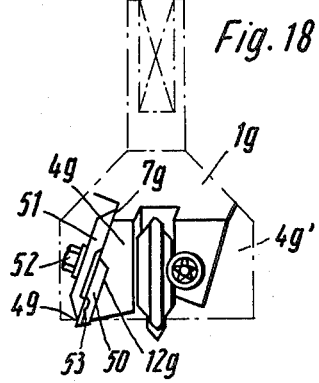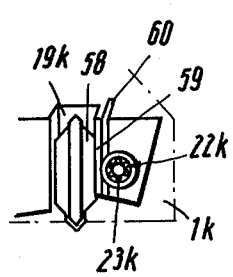

DRILLING TOOL

The present invention relates to a tool for drilling holes, such as cylinder head drill, woodworking drill, and the like which includes a carrier member having at least one endwise arranged end face cutter, or first cutting means, and at least one precutter, or second cutting means, extending in endwise direction and circumferentially beyond the carrier member, the precutter defining the diameter of the hole to be produced with the tool and including at least one cutting edge.

The precutters of a known drilling tool of this type become worn in a relatively short period of time when carrying out drilling therewith. As wearing of the tool progresses, the working diameter of the drilling tool decreases. This causes undesirable drill tolerances in a manner that the components intended for the bores cannot be inserted into the bores. In the known drilling tool the precutters and the end face cutters, however, are unitary with the carrier member, so that on wearing of the precutter and/or end face cutter, not only the worn cutter has to be replaced but the entire relatively expensive tool carrier or assembly.

It is an object of the present invention to provide a drilling tool in a manner such that the diameter of the hole to be produced with the tool does not change even after lengthy use of the drilling tool and that the cutting means or cutters can be replaced or exchanged in an economical manner.

This object and other objects and advantages of the invention will appear more clearly from the following specification in connection with the accompanying drawings, in which:

FIG. 5 is a side elevational view of a second cutting element or precutter of the embodiment of FIG. 1 drawn to a larger scale and in the position indicated in FIG. 4 but turned through 90°;

FIG. 6 is a section along line VI—VI of FIG. 5;

FIGS. 7 to 16 are representations of further embodiments of a precutter similar to the views indicated in FIGS. 5 and 6;

FIG. 17 is a side elevational view of a further embodiment of the drilling tool in accordance with the invention;

FIG. 18 is a side elevational view of yet another embodiment of the drilling tool;

FIG. 19 is an end view of yet another embodiment of a drilling tool according to the present invention;

FIG. 20 is a side elevational view, partially in section, of part of yet another embodiment of a drilling tool according to the invention; and FIG. 21 is a side elevational view of part of still another embodiment of a drilling tool according to the present invention.

Figure 2:
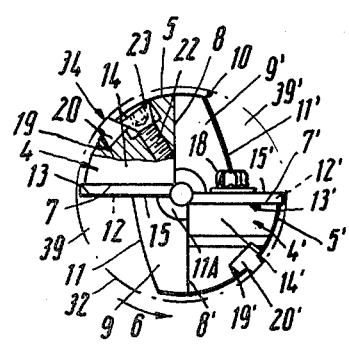
FIG. 2 is an end view of the end face of the drilling tool according to FIG. 1.

The present invention is characterized primarily thereby that at least the part adjacent the cutting edge of the precutter is approximately parallel to the pertaining circumferential portion of the carrier member, that the outer side includes at least one guide parallel to the outer circumferential portion, and that the end face cutter and the precutter are removably securable with at least one clamping element to the carrier member and that these cutting means are in the form of reversible cutting elements.

In accordance with one embodiment of the invention, the precutter includes in at least one of its axially extending longitudinal rims or sides a depression for receiving therein the clamping element, for example in the form of a centering and clamping screw.

In accordance with another embodiment of the invention, the clamping element includes a centering and clamping portion which is formed to correspond in shape to the depression in the precutter.

In accordance with another embodiment of the invention, the centering and clamping portion of the clamping element is conically formed.

In accordance with another embodiment of the invention, the guide extends approximately parallel to the axis of rotation of the drilling tool.

In accordance with yet another embodiment of the invention, the guide has a length which corresponds to the axial length of the precutter.

In accordance with yet another embodiment of the invention, the guide forms part of the outer side of the precutter.

In accordance with yet another embodiment of the invention, the guide is of constant width over its length.

In accordance with another embodiment of the invention, the carrier member comprises two diametrically opposed support members for respectively receiving an end face cutter and a precutter and the two support members are in radial direction approximately of quadrantal-like cross section.

In accordance with yet another embodiment of the invention, the end face cutter is operatively connectible on the forward side of the pertaining support member, viewed in the direction of rotation of the drilling tool.

In accordance with a preferred embodiment, the drilling tool includes two end face cutters wherein the two cutters, respectively, embrace with the axis of rotation of the drilling tool an acute angle closed in the direction towards the end face of the drilling tool and wherein the two end face cutters converge in the direction towards the end face of the drilling tool.

In accordance with another embodiment of the invention, the pertaining cutting edge provided at the end face of the end face cutter extends slopingly increasingly from the circumferential receiving portion towards the central axis of the drilling tool.

In accordance with yet another embodiment of the invention, the longitudinal central planes of the end face cutters and the longitudinal central planes of the precutters embrace an acute angle opening in the direction of the end face of the drilling tool.

In accordance with yet another embodiment of the invention, the drilling tool comprises a throughbore for receiving therein a centering pin in the form of a plug-in part which is securable by means of an adjustment or set screw which adjustment screw extends radially to the axis of rotation of the drilling tool.

In accordance with yet another embodiment of the invention, the centering pin is in contact for axial adjustment thereof with an adjustment part which is axially adjustable and form-lockingly supportable in the throughbore.

According to another embodiment of the invention, the end of the bore opposite to the end through which the centering pin projects receives an adjustment element, preferably in the form of la threaded member, such as a screw, which is axially adjustable.

In accordance with another preferred embodiment of the invention, the drilling tool includes at least one further end face cutter and at least one further precutter which are provided on a portion of the carrier member determining a larger diameter of the hole to be produced and which are provided on the side which is opposite to the end face of the other end face cutters and precutters of the drilling tool.

In accordance with yet another embodiment of the invention, an end face cutter is provided which is positioned between a holder means and a clamping part which are mountable on the carrier member and whereby the length of the precutter is maximally equal to half the length of the clamping part.

In accordance with yet another embodiment of the invention, the end face cutter and the precutter are jointly mountable on the carrier member by means of a clamping part extending approximately tangentially to a circle about the axis of rotation of the drilling tool.

In accordance with still another embodiment of the invention, the clamping part is comprised of a nut supportable on the end face cutter and a centering and clamping screw threadedly insertable in the end face cutter, which centering and clamping screw engages with its head lateral depressions of the precutter.

In accordance with yet another embodiment of the invention, the longitudinal central plane extending parallel to the axis of rotation of the drilling tool of the centering and clamping screw and the longitudinal central planes of the precutters embrace an acute angle.

In accordance with another preferred embodiment of the invention, the end face cutters and/or the precutters include reversible cutting plates.

In accordance with yet another embodiment of the invention, the end face cutter is provided by a rectangular plate.

The drilling tool according to the present invention can be used to drill holes in materials, such as wood, plastic materials, synthetic materials, or similar materials.

Referring now particularly to the embodiment of the invention shown in FIGS. 1 to 4, the drilling tool includes a carrier member 1 with a conical section 2 which is followed at its end by a shaft portion 3. The conical carrier member section 2 merges at its end opposite to shaft portion 3 into wing-like support members 4 and 4' which are positioned at a distance from each other. Preferably, the shaft portion 3 and the carrier member 1 are unitary in structure.

Figure 3:
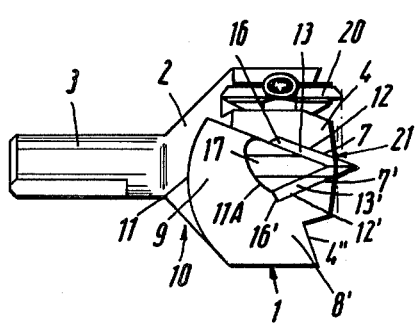
FIG. 3 is a side elevational view of the drilling tool according to FIG. 1.

The two support members 4 and 4' are of circular sector-like outline with an angle at the center of about 90°, when viewed in plan as indicated in FIG. 2. The curved circumferential receiving portions 5 and 5' of the support members 4 and 4' are positioned on the outer surface of an imaginary cylinder and form part of the outer surface of the carrier member 1. The arrow designated by numeral 6 in FIG. 2 indicates the direction of rotation of the drilling tool. The forward sides, in the direction of arrow 6, sides 7 and 7' of the two support members are planar and embrace an acute angle with the vertical axis of the drilling tool indicated in dot-dash line in FIG. 2. As shown in FIG. 3, the forward sides 7 and 7' of the support members 4 and 4' converge in the direction of the end face of the drilling tool. The rearward sides 8 and 8' of the two support members 4 and 4' merge continuously curvingly with the outer sides 9 and 9' of a connection section 10 which joins the two support members 4 and 4' with each other and forms part of the carrier member 1. The two outer sides 9 and 9' of the connection section 10 converge in the direction of the end face of the drilling tool and each one thereof follows approximately at a right angle the pertaining forward side 7 or 7' of the pertaining support member 4 and 4'. The upper surface 11A of the connection section 10 (FIGS. 2 and 3) directed toward the end face of the drilling tool is convex with respect to the end face of the drilling tool and merges with the pertaining forward side 7 or 7' of the two support members.

Figure 1:
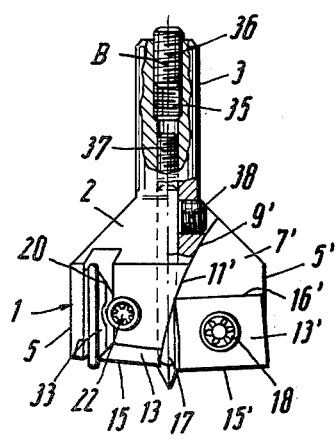
FIG. 1 is a side elevational view, partially in cross section, of an embodiment of a drilling tool in accordance with the invention.

The two outer sides 9 and 9' of the connection section 10 are, respectively, at an obtuse angle next to the outer surface of the conical section 2, along a line 11 and 11' convex to the end face of the drilling tool (FIGS. 1 to 3). Also when viewed in plan (FIG. 2), the edges 11 and 11' extend convexly relative to the axis of rotation of the drilling tool. As indicated in FIG. 2, the connection section 10 is reduced from a point corresponding to half its length in the direction to its two ends.

In the two forward sides 7 and 7' of the support members 4 and 4' pertaining depressions 12 and 12' are provided for operatively securing therein a pertaining reversible end face or first cutting means 13 or 13'. The two depressions 12 and 12' are open in the direction of the receiving portion 5 and 5', the rearward sides 8 and 8' and the end faces 14 and 14' of the two support members 4 and 4'. The two end face cutters 13 and 13' extend beyond the end faces 14 and 14' of the support members and extend over the entire width of the forward sides 7 and 7' of the support members 4 and 4' (FIG. 2). As is indicated in FIG. 1, the cutting edges 15 and 15' of the two reversible end face cutters are on the outer surface of an imaginary obtuse angled cone, the axis of which coincides with the axis of rotation of the drilling tool and which cone is open in the direction of the shaft portion 3. The slanted positioning of the two cutting edges is achieved by a correspondingly slanted positioning of the two reversible end face cutters 13 and 13'.

In order to achieve a simple and accurate assembly of the reversible end face cutters 13 and 13', the lateral sides 16 and 16' opposite to the cutting edges 15 and 15' are slanted in accordance with the depressions 12 and 12'. The two end face cutters then assume the exact assembly position when they are in contact with their pertaining sides on these lateral sides 16 and 16'. This will eliminate extensive efforts of alignment. Preferably, the two reversible end face cutters 13 and 13' are provided in the form of rectangular reversible cutting edge plates, so that upon wear of one cutting edge of the reversible end face cutter this one only needs to be reversed. The two reversible end face cutters, in the plan view according to FIG. 2, are parallel to each other and their cutting edges 15 and 15' extend in a common plane which extends through the axis of rotation of the drilling tool. The end face cutters 13 and 13' are preferably provided by rectangular plates so that they are readily manufactured.

The two end face cutters 13 and 13' are in contact with the inner edges in the region of the end faces 14 and 14' of the two support members 4 and 4' with a centering pin coaxial with the axis of rotation of the drilling tool. Since the cutting edges 15 and 15' of the two end face cutters are at an obtuse angle relative to each other, at commencement of drilling, the reversible end face cutters or edges are not over their full widths at the same time in operative engagement with the piece to be worked on. Corresponding to the slanted positioning of the two cutting edges, initially only the section in the region of the centering pin 17 of the end faces is in contact with the piece to be worked on. This means that only a relatively small advancement force for drilling will be required. This is of advantage when drilling plates or sheets for the production of furniture which are coated with a wear-resistant surface layer, for example provided by synthetic material or plastic material. In particular, in the case of plastic or synthetic material-coated workpieces, accurate bores can be produced with the drilling tool according to the invention.

The two reversible end face cutters 13 and 13' are respectively secured by means of a screw 18 on the forward sides 7 and 7' of the support members 4 and 4'.

Each circumferential receiving portion or outer side 5 and 5' of the two supporting members 4 and 4' includes a depression or groove 19, 19' for securing therein a pertaining reversible precutter or second cutting means, 20, 20'. The groove 19, 19' is of rectangular cross section and open in the direction of end faces 14 and 14' of the two support members 4 and 4', and in the direction of the conical section 2 of the carrier member 1. The reversible precutters 20, 20' extend beyond the end faces 14 and 14' and beyond the cutting edges 15 and 15' of the reversible end face cutters 13 and 13'. The distance by which the reversible cutters 20 and 20' extend beyond the cutting edges 15 and 15' of the reversible end face cutters 13 and 13' is indicated by the numeral 21 in FIG. 3.

Figure 4:
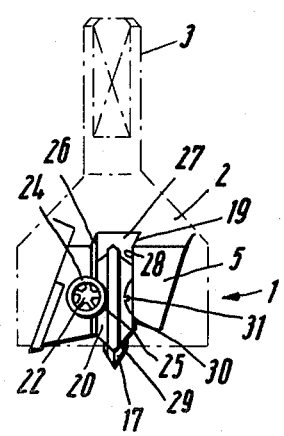
FIG. 4 is a further side elevational view of the drilling tool according to FIG. 1 with parts of the carrier member shown in dot-dash outline.

The two reversible precutters 20 and 20' are mounted by means of a pertaining holding element 22, preferably a clamping screw, in the groove or depression 19, 19'. The holding elements 22 each include a conical centering and clamping head 23 (FIG. 2). The conical centering and clamping head 23 is adapted to engage in part in a partial cylinder-like depression 24 in one of the side walls of the groove or depression 19, 19' and in part in a depression 25, in cross section partial circle-like or semicircular, in the lateral surface 26 of the reversible precutter 20, 20" (FIG. 4). The bottom surface of the depression 25 in the reversible precutter 20, 20" is advantageously formed so that it is in full contact with its surface with the head 23 of the holding element 22. Due to the conical formation of the centering and clamping head 23, the reversible precutter is held in axial direction with a constant distance 21 relative to the reversible end face cutters 13, 13' and, simultaneously, in radial direction and in the circumferential direction clamped against the bottom 27 and against the lateral surface 28 opposite the centering and clamping head 23 of the holding element 22 in the groove or depression 19, 19'. The reversible precutters 20 and 20' are thus secured against shifting in the depression or groove 19, 19'. This advantageously enhances the accuracy of cutting of the drilling tool.

Due to the lateral depression 25 in the lateral surface 26 of the reversible precutter, a simple installation of the reversible precutter is ensured; particularly no special and time consuming aligning of the reversible precutter relative to the carrier member is required.

The holding elements 22 can be in the form of countersunk screws, which do not extend with their centering and clamping heads 23 beyond the circumferential receiving portions or surfaces 5 or 5', so that they do not interfere during drilling. The threaded bores for the countersunk screws extend approximately radially in the two support members 4, 4' (FIG. 2). Instead of the two reversible precutters 20, 20' a single reversible precutter is sufficient.

As is further explained with reference to FIGS. 5 to 16, the cutting edge 29 (FIG. 4) of the reversible precutters 20, 20' is provided by part of the outer circumference of the reversible precutter.

On each support member 4, 4' there is mounted respectively one reversible end face cutter and one reversible precutter. As indicated in FIG. 4, the depression or groove 19, 19' receiving the reversible precutter can be provided in the outer surface or receiving portion 5, 5', in circumferential direction of the carrier member 1 approximately at a point corresponding to half the width of the outer surface 5, 5'. The precutter is preferably in the form of a reversible precutter, so that the precutter can be reversed when one cutting edge has become worn. For this purpose, also in the other lateral surface 30 of the precutter there is provided a depression 31 for the head 23 of a holding element 22, which depression 31 corresponds to the depression 25 in the lateral surface 26.

In order to ensure an accurate diameter constant of the circle described by the cutting tool, generally indicated by numeral 32 in FIG. 2, and to ensure an accurate rotation, the reversible precutter 20, 20' is provided on its outer surface 33 (FIG. 5), with at least one guide surface 34, which, according to FIG. 2, extends on the circle 32. The guide surface 34 is approximately parallel to the outer side or receiving portion 5, 5' of the pertaining support member 4, 4' and is in the form of a bevel or chamfer. During drilling, the guide surface 34 is in contact with the wall of the bore and provides a constant drill hole diameter independent of the duration of use of the drilling tool.

The shaft portion 3 and the carrier member 1 comprise a throughbore 35 (FIG. 1) into one end of which there is inserted the centering pin 17 extending beyond the end face of the drilling tool. In the other end of the bore 35 extending in shaft portion 3, there is threadedly inserted a screw 36 which is in contact through the intervention of threaded pin 37 with the centering pin 17. The threaded pin 37 is positioned roughly at the point corresponding to half the length of the bore 35.

The centering pin 17 inserted in the bore 35 can be adjusted by means of the threaded pin 37. In the respective selected position, the centering pin 17 is secured by means of a set screw 38 which extends transversely to the axis of rotation of the drilling tool. The set screw 38 is received in a countersunk hole furnished with thread in the conical section 2 of the carrier member 1. Due to the axial adjustment afforded by this arrangement, the distance of the centering pin 17 beyond the reversible end face cutter 13, 13' and the reversible precutter 20, 20' can be adjusted in relation to the degree of wear of the tool. The cylindrically formed centering pin 17 can be replaced with a new centering pin upon damage or wear thereof.

Since the bore 35 in the shaft portion 3 and the bore for the centering pin 17 is provided by a continuous or throughbore, no alignment problems will arise so that the tool exhibits an absolutely accurate rotation accuracy. The screw 36 adjustably provided in shaft portion 3 is particularly of advantage when working with multiple spindle apparatus in which for each spindle a drilling tool is provided. The screws 36 in the shaft portion 3 can then serve as abutment end faces for the counter faces provided in the multiple spindle apparatus so that the individual drilling tools can be adjusted by corresponding adjustment of the screws 36 to respective accurately determined heights.

The drilling tool is provided with substantial drilling dust or cuttings receiving apertures 39, 39′ (FIG. 2) in the region between the two support members 4, 4′ extending from the end face of the drilling tool to the conical section 2 of the carrier member 1. In circumferential direction of the drilling tool these receiving apertures 39, 39′ are limited by forward sides 7, 7′ and rearward sides 8, 8′ of the two support members. Drilling dust or cuttings are passed over the outer side 9, 9′ of the connection section 10, which serve as cuttings removal surfaces, out of the cuttings receiving apertures 39, 39′. The cuttings are positively passed or directed out of the cuttings receiving apertures 39, 39′ on the outer sides 9, 9′ extending in the direction towards the shaft portion 3 and radially outwardly.

Various embodiments of precutters are illustrates in FIGS. 5 to 16 which are, respectively, advantageously in the form of reversible precutters. Of course, also precutters may be employed which are not in the form of reversible cutters. The reversible precutters shown in these figures have a width to length ratio of about 1:3, thus, they are relatively narrow so that the depressions or grooves 19, 19′ in the carrier member 1 can also be relatively narrow. The support members 4, 4′ are therefore not too extensively reduced in strength. Preferred are precutters which are symmetrical so that by their installation in the drilling tool their position is not of too great concern.

The reversible precutters 20, 20′ according to FIGS. 5 and 6 are plate-like cutters of double-trapezoidal outline in plan view. The oppositely arranged longitudinal edges or rims 40, 40′ of the precutter extend slopingly from the outer surface 33 in the direction towards the rearward side or surface 31. The two longitudinal rims or sides are provided at the point corresponding to half the length of the precutter with pertaining depressions 25, 31 for operative engagement with the head 23 of the holding element 22. The bottom or surface of the depression 25, 31 is, respectively, on the outer surface of an imaginary truncated cone. On the outer side or surface 33 there is provided at the center a rectangular, in cross section, projection 42 which extends over the full length of the precutter and the outer side of which provides the guide surface 34 of the precutter. Since the guide surface 34 extends over the full length of the precutter, the drilling tool is securely supported on the wall of the bore to be produced, so that the tool can be used with very small tolerances. The two longitudinal edges 40, 40′ merge, respectively, with rim or edge sections 43, 43′, 43″, and 43‴, which extend slopingly towards each other, and which, respectively, come together in a tip 44, 44′. The two rim or edge sections 43, 43′ and 43‴, 43‴ at both ends of the precutter are inclined in the direction toward each other, not shown in detail, and come together in an edge coincidental with the longitudinal central plane indicated at "A". The lines of intersection between the edge sections 43a, 43b, 43c and 43d of the guide surface 35 and the guide surface of the precutter, respectively, provide the cutting edges 29 (FIG. 4). The rim or edge sections 43 to 43‴ and the rim or side sections 43a to 43d have the same inclination. The cutting edges extend in a plane approximately parallel to the pertaining circumferential receiving portion of the repective support member 4, 4′, so that the precutter can be sharpened after use without varying the diameter of cutting as indicated by circles 32.

In the embodiment according to FIGS. 7 and 8, the rearward surface 41a of the precutter 20a is continuously curved and in the cross section according to FIG. 8 extends on a circle portion. The precutter is in contact with this rearward surface with the bottom 27 of said depression or groove 19, 19′. Due to the curved rearward surface 41a, a larger support surface is obtained and, thereby, a more secure mounting of the precutter in the pertaining depression. Otherwise, the precutter according to FIGS. 7 and 8 is alike to the precutter according to FIGS. 5 and 6.

The step-like projection 42′ of the precutter according to FIG. 8a is of rectangular cross section and its support surface 34′ is wider than the support surface of the embodiment according to FIG. 8.

In the embodiment according to FIG. 8b, projection 42″ has a trapezoidal outwardly reducing cross section.

The guide surface 34‴ of the step-like projection 42‴ according to FIG. 8c is continuously curved over its width. Preferably this surface is coincidental on an outer surface of a cylinder.

The step-like projection 42a′ according to FIG. 8d is in cross section at least approximately semi-circularly shaped. The guide surface 34a′ is at least provided by part of the curved outer side of the projection.

The step-like projection 42a″ according to FIG. 8e has in the region of its outer side a triangular cross section. The guide 34a″ is, in this embodiment, provided by the triangular tip of the projection.

The precutter 20b according to FIGS. 9 and 10 has in plan view the same outline as the two embodiments described above. The underside or rearward side 41b is planar, while the outer side 33b is continuously curved over its width and in the cross section according to FIG. 10 is on a circular arc. The guide surface 34b is self-forming. This provides for a very wide guide surface which extends over the entire length of the precutter, which guide surface leads to an improved guide of the tool in the bore.

The precutter 20c according to FIGS. 11 and 12 is of octagonal cross section with approximately equally long sides. The outer side or surface 33c which forms the guide surface 34c is planar and, in the plan view according to FIG. 11, of rectangular outline with substantially greater longitudinal sides than narrower sides. The outer side or surface 33c merges with those longitudinal sides or edges into the longitudinal edges 40c, 40c′ of the precutter. In the plan view according to FIG. 11, the two longitudinal edges 40c, 40c′ are of generally trapezoidal outline, the base of which is provided by the longitudinal sides of the outer side or surface 33c. The longitudinal edges 40c, 40c′, respectively, merge with parallel to each other and perpendicularly to the outer and/or underside or surface 33c and 41c extending lateral sections 45, 45′, which, respectively, are provided at the point corresponding to half the length with depressions 25c, 31c for the conical head 23 of the holding element 22, which depressions extend into the longitudinal edges or rims 40c, 40c′. The lateral sections 45, 45′ follow with further, slopingly with respect to each other extending rim or edge sections 46, 46′ the underside or rearward side or surface 41c. Instead of the tips as described with respect to the foregoing embodiments, the two narrow edges of the outer side or surface 33c are provided. In comparison to the embodiments described earlier, this will reduce the wear of the precutter.

The precutter 20d according to FIGS. 13 and 14 is, in cross section, in the form of an equilateral triangle with flattened edges. The outer side or surface 33d extends as a narrow strip over the entire length of the precutter and merges with its two longitudinal sides into the longitudinal edge sections 40d, 40d', which diverge in the direction towards the underside of surface 41d. The planar outer side or surface 33d provides the guide surface 34d and is parallel to the rearward surface 41d which is substantially wider. The two longitudinal rims or edges 40d, 40d' are connected or combined by rim sections 46d, 46d' extending slopingly in the direction towards each other with the rearward surface 41d. According to FIG. 14, the length of the longitudinal rims 40d, 40d' is substantially greater than the width of the outer side or surface 33d and the rim or edge sections 46d, 46d'. Otherwise, the precutter 20d, in plan view, has a generaly similar outline as the precutter according to FIGS. 11 and 12. A secure support of the precutter in the carrier member is achieved by the wide rearward surface 41d.

The precutter 20e according to FIGS. 15 and 16 has over nearly its entire length a circular cross section. Only at the two ends is the precutter provided for the formation of cutting edges 29 in the direction of its support surface with sloped or chamfered portions. This, however, is not indicated in FIGS. 15 and 16. Furthermore, the precutter 20e includes depressions or grooves, not shown, for the head 23 of the holding element 22. The guide surface 34e is provided by part of the circumferential surface 33e. The precutter 20e is easily produced. The pertaining cutting edges 29 extending, respectively, slanted or obliquely towards each other, extend at the two ends of the reversible precutter rounded into each other.

The reversible cutters are secured in the carrier member 1 in a manner that their respective longitudinal axis extends approximately parallel to the axis of rotation b of the drilling tool. The guide surfaces which are formed by the part of the reversible precutter which extends radially furthest beyond the carrier member 1, ensure a constant cutting edge as is indicated by circle 32, and, accordingly, very small bore tolerances. The cutting edges 29 extend, when viewed in plan, respectively, at an acute angle to the longitudinal axis "B" and at the outer side of the reversible precutter, so that they can be sharpened at any time on wear thereof, without changing the position of the guide surface relative to the carrier member. The reversible precutter itself is adjustable exactly relative to the end face cutters 13, 13' as a matter of course due to the conical clamping head 23 and the associated depressions in the longitudinal sides or edges of the reversible precutter. The cuttings or shavings which are formed during dulling are removed along the outer sides 9, 9' of the connection section 10 immediately out of the cutting receiving apertures 39, 39', so that premature wear markings are avoided on the reversible end face cutters 13, 13'.

The drilling tool according to FIG. 17 is in the form of a so-called step-chamfering or countersink drill tool, which in addition to the reversible end face cutters 13, 13' and the reversible precutters 20, 20' includes at least one further reversible end face cutter 47 and at least one further reversible precutter 48. The further reversible end face cutters and precutters are removably secured in the same manner on the carrier member 1f as the reversible end face cutters 13, 13' and the reversible precutters 20, 20' of the drilling tool according to FIGS. 1-4. The further reversible end face cutters and precutters are axially offset in the direction to the shaft portion 3f relative to the reversible end face cutters 13, 13' and the reversible precutters 20, 20'. Furthermore, the carrier member 1f has a larger diameter in the region of the further reversible end face cutters 47 and the reversible precutters 48 than in the region of the reversible end face cutters 13, 13' and the reversible precutters 20, 20'. With the exception of the greater diameter, the carrier member 1f is in the region of the further reversible end face cutters and reversible precutters similar in shape to the end face region of the reversible end face cutters 13, 13' and the reversible precutters 20, 20'. The section of the carrier member 1f having the larger diameter, thereby, merges by way of a rectangular step with the end portion of the carrier member which includes the cutters 13, 13' and 20, 20'. The further reversible end face cutters 47 and reversible precutters 48 can also be axially offset in the circumferential direction relative to the reversible end face cutters 13, 13' and the reversible precutters 20, 20'. This will provide for a more quiet operation of the drilling tool. When working with the countersink drill tool according to FIG. 17, initially the first projecting reversible end face cutters and reversible precutters start the drilling action. As the drilling progresses, the further reversible end face cutters and reversible precutters engage with the piece to be worked on and attain the final diameter for the bore.

FIG. 18 shows a further embodiment of the invention in which in place of the relatively large reversible end face cutters 13 and 13' of the embodiments described in the foregoing, a substantially smaller reversible end face cutter 49 is employed. This small reversible end face cutter 49 is preferably in the form of a reversible plate which is clamped between a holder 50 and a clamping part 51 by means of a clamping screw. The carrier member 1g of the drilling tool according to FIG. 18 is generally identical to that of the embodiment according to FIGS. 1-4 and is, accordingly, only shown in dot-dash outline. This will allow to selectively provide on the carrier member either the reversible end face cutters 13,13' according to FIGS. 1-2 or the relatively small reversible end face cutter 49 according to FIG. 18. Due to the reduced dimensions of the reversible end face cutter 49 in comparison with the reversible end face cutters 13, 13', a smaller amount of material is required therefor, so that the smaller reversible end face cutters can be produced more economically. The reversible end face cutter 49 is form lockingly securable in the depression or groove 53 at the operating end of the holder 50, which, in turn, is form lockingly provided in the depression or groove 12g in the support members 4g, 4g' of the carrier member 1g. The clamping part 51 is supported on the end face cutter 49 and on the pertaining forward side 7g of the two support members.

With reference to the embodiments of FIGS. 19 and 20, the reversible end face cutter and reversible precutter of each support member are held by a single holding element on the support member. In the case of the drilling tool according to FIG. 19, the holding element is in the form of a bushing of sleeve-like clamping nut 54 which is supported with its head on the forward side, in the direction of rotation indicated by arrow 6h, of the reversible end face cutter 13h, 13h'. The clamping nut 54 passes through the respective reversible end face cutter in perpendicular direction and receives a countersunk screw 55 which is in contact with its conically formed head 56 in a depression 57 in the outer side or portion 5h of the pertaining support member 4h, 4h'. The screw head 56 engages in the depression 25h at the longitudinal edge or rim of the reversible precutter 15h, 15h'. The countersunk screw 54 extends essentially tangentially to the circle about the axis of rotation of the drilling tool. The end face cutter and the associated reversible precutter are simultaneously retained and clamped, and are held selflockingly in the axial and radial position by means of the clamping nut 54 and the countersunk screw 55. Due to this formation, the drilling tool is of simple structure and the various cutters can be simply and rapidly secured on the carrier member.

In the embodiment according to FIG. 20, the clamping nut 54i is in the form of a cap nut which is supported on the forward side of the reversible end face cutters 13i, 13i'. The threaded bore 58 in the cap nut 54i is at an angle to the axis of the cap nut and receives the countersunk screw 55i. Countersunk screw 55i has a conically formed head 56i which operatively engages in the depression in the longitudinal rim or edge of the reversible precutter 20i. Also in this embodiment, the clamping nut or cap nut 54i and the countersunk screw 55i serve to simultaneously clamp or retain, and self lockingly secure the pertaining end face cutters and the pertaining reversible precutters in their axial and radial position on the carrier member.

The devices according to the invention provide during use thereof stable dynamic conditions and can be maintained in a simple manner, they provide for time savings and are economical. In place of the precutters described, these can also be in the form of multi-cornered bodies or can include other embodiments. The clamping screws or elements 22 are then to be arranged in a corresponding manner, for example immediately behind the end face cutter.

The cutting edges 20 of the precutter extend essentially in the outer surface portions of the guide surface which extends axially beyond the end face cutters.

In the two embodiments according to FIGS. 5 to 8, the projection 42 of the precutter can be slanted in the region of its outer side in such a manner that it in cross section corresponding to FIGS. 6 and 8 terminates in a tip. The edge included in this tip of the precutter then provides the guide for the drilling tool to ensure a constant bore diameter independent of wear of the precutter. The edge or tip, respectively, of the reversible precutter can also be slanted in such a manner that a planar or curved outer side of the projection is obtained, which projection is narrowed in the region of this outer side.

In the embodiment according to FIGS. 1 to 4, the screw 18 is provided on the forward, in the direction of rotation indicated by arrow 6, side of the reversible end face cutters 13, 13' (FIGS. 1 and 2) and extends, therefore, into the cuttings receiving apertures 39, 39'. In place of the screw 18 also a countersunk screw can be used the head of which is embedded in the reversible end face cutter. Thus no accumulation of cuttings occurs on removal of the cuttings from the apertures 39, 39'.

In the embodiment according to FIG. 21, the precutter 58 is clamped by a holding element 22h on the carrier member 1k with a clamping lip 59 being interpositioned thereat. The clamping lip 59 is unitary with the carrier member 1k and is formed by a ridge cut out of the carrier member which ridge is separated by a slot 60 from the adjacent, in circumferential direction, carrier member. The lateral surface of the clamping lip or ridge 59 directed away from this carrier member part forms one lateral wall of the depression or groove 19k for the precutter 58. On screwing in of the holding element 22h, preferably in the form of a clamping screw, into the carrier member part adjacent the lip or ridge 59, the ridge or lip 59 is pressed by the conical centering and clamping head 23k of the holding element 22k while elastically being deformed against the precutter 58 positioned in the groove 19k. The precutter 58 is thus securely mounted in the groove 19k.

Due to the at least nearly parallel positioning of the outer wall, side or edge portion of the reversible precutter adjacent the cutting edge, and due to the guide or guide surface at the pertaining curved circumferential receiving portion or section of the carrier member, the bore diameter is constant even after extended use, so that manufacturing tolerances remain unchanged independent of the duration of use of the drilling tool. The guide or guide surface provides a constant hole diameter independent of the degree of wear of the reversible precutter. The reversible precutter can be sharpened without changing the hole diameter so that an optimal usage of the reversible precutter is attained. The embracing surface described by the carrier member during rotation thereof is in contact during drilling with the wall of the hole to be drilled and ensures an accurate rotational movement of the drilling tool. The end face and/or precutter can be removed upon wear from the tool carrier member and can be replaced by new cutters, so that not the entire, usually expensive, carrier member assembly has to be replaced.

The present invention is, of course, in no way restricted to the specific disclosure of the specification and drawings, but also encompasses any modifications within the scope of the appended claims.

What I claim is:

1. A tool for drilling holes, especially a cylinder head drill, woodworking drill, and the like, comprising:
a carrier member having a cutting means retaining end, a chucking end opposite to said cutting means retaining end, and a circumferential receiving portion at said cutting means receiving end;
at least one first cutting means operatively connectible to said cutting means retaining end of said carrier member for endwise cutting with said tool;
at least one second cutting means operatively connectible to said cutting means retaining end of said carrier member and projecting axially beyond said cutting means retaining end for defining the diameter of the hole to be produced with said tool, and including:
    at least one cutting edge;
    a contact surface adapted to provide at least one point of contact with said receiving portion;
    a guide surface diametrically opposite to said contact surface and substantially parallel thereto; and
means for operatively retaining said first and second cutting means on said cutting means retaining end of said carrier member.

2. A tool in accordance with claim 1, wherein said at least one second cutting means includes at least one groove for operative engagement with said retaining means.

3. A tool in accordance with claim 2, wherein said means for operatively retaining said first and second cutting means includes a screw having a head portion adapted to engage said groove.

4. A tool in accordance with claim 3, wherein said head portion of said screw includes a conical head portion.

5. A tool in accordance with claim 1, wherein said guide surface extends parallel to the longitudinal central axis of said tool.

6. A tool in accordance with claim 1, wherein said guide surface extends at least nearly over the full length of said second cutting means.

7. A tool in accordance with claim 1, wherein said guide surface is provided by part of the surface of said second cutting element extending diametrically opposite to said contact surface.

8. A tool in accordance with claim 1, wherein said guide surface has a constant width over its length.

9. A tool in accordance with claim 1, including two first cutting means and two second cutting means; and further comprising:
two at least nearly diametrically opposed support members for receiving one each of said first and second cutting means, each of said support members having a cross sectional outline in the radial direction corresponding to a quadrantal section of a circle.

10. A tool in accordance with claim 9, wherein each of said first cutting means includes a reversible cutting means, said reversible cutting means being removably securable on a pertaining support member at the cutting means retaining end of said tool to be forwardly projecting therefrom.

11. A tool in accordance with claim 1, including two first cutting means, each of said first cutting means having an inclination to the central longitudinal axis of said tool which corresponds to a closed acute angle and wherein each of said cutting means converges in the axis direction towards the end face of said tool.

12. A tool in accordance with claim 11, wherein each of said two first cutting means includes a cutting edge at the end face of a pertaining first cutting means, said cutting edge extending increasingly in slope in the direction from a pertaining receiving portion towards the central longitudinal axis of said tool.

13. A tool in accordance with claim 1, wherein the longitudinal central plane of said first cutting means and the longitudinal central plane of said second cutting means embrace an acute angle open in the direction of the end face of the drilling tool.

14. A tool in accordance with claim 1, and further comprising:
a through bore longitudinally extending in said carrier member between said cutting means retaining end and said chucking end;
a centering pin operatively retainable in said through bore; and
set screw means extending radially to the longitudinal central axis of said tool for fixing the position of said centering pin.

15. A tool in accordance with claim 14, wherein said centering pin is axially movable in said through bore, and further comprising:
a pin means form-lockingly retainable in said bore and in contact with said centering pin for axially moving said centering pin.

16. A tool in accordance with claim 15, and further comprising:
an axially movable adjustment member provided in that end of the bore adjacent the chucking end of said carrier member.

17. A tool in accordance with claim 16, wherein said axially movable adjustment member includes a screw.

18. A tool in accordance with claim 1, including two first cutting means, wherein the further first cutting means is provided in the region towards the chucking end of said carrier member and defining a larger bore diameter than the first recited cutting means; and
including two second cutting means, wherein said further cutting means is provided in the region towards the chucking end of said carrier member and defines a larger bore diameter than said first recited first cutting means.

19. A tool in accordance with claim 1, wherein said first cutting means includes a reversible cutting means and further comprising:
a holder means and a clamping means for operatively receiving said reversible cutting means therebetween and mountable on said carrier member, said reversible cutting means having a length corresponding to half the length of said clamping means.

20. A tool in accordance with claim 1, wherein said first cutting means and said second cutting means includes reversible cutting means, and wherein said means for operatively retaining said first and second reversible cutting means includes a single holding element extending at least nearly tangentially to a circle about the axis of rotation of said tool.

21. A tool in accordance with claim 20, wherein said single holding element comprises:
a nut supportable on said first reversible cutting means; and
a centering and clamping screw threadably engageable in said nut, said screw having a head portion operatively engageable in said groove in said second reversible cutting means.

22. A tool in accordance with claim 20, wherein the longitudinal central plane of said reversible second cutting means and the central longitudinal plane of said holding element embrace on acute angle.

23. A tool in accordance with claim 1, wherein at least one of said first and second cutting means is in the form of a reversible cutting plate.

24. A tool in accordance with claim 1, wherein said first cutting means includes a rectangular cutting plate.

* * * * *